US012580777B2

(12) United States Patent
Hojjati

(10) Patent No.: US 12,580,777 B2
(45) Date of Patent: Mar. 17, 2026

(54) UTILIZING X.509 CERTIFICATES FOR ACCESS TO LOCATION TRACKING, PHYSICAL LOCATION, OR DIGITAL CONTENT

(71) Applicant: DigiCert, Inc., Lehi, UT (US)

(72) Inventor: Avesta Hojjati, Austin, TX (US)

(73) Assignee: DigiCert, Inc., Lehi, UT (US)

( * ) Notice: Subject to any disclaimer, the term of this patent is extended or adjusted under 35 U.S.C. 154(b) by 141 days.

(21) Appl. No.: 18/499,533

(22) Filed: Nov. 1, 2023

(65) Prior Publication Data

US 2025/0141698 A1    May 1, 2025

(51) Int. Cl.
*H04L 9/32* (2006.01)
*H04L 9/30* (2006.01)

(52) U.S. Cl.
CPC .............. *H04L 9/3263* (2013.01); *H04L 9/30* (2013.01)

(58) Field of Classification Search
None
See application file for complete search history.

(56) References Cited

U.S. PATENT DOCUMENTS

| | | | |
|---|---|---|---|
| 2004/0162984 A1* | 8/2004 | Freeman | H04L 9/3268 713/176 |
| 2014/0325209 A1* | 10/2014 | Koster | H04L 9/3268 726/10 |
| 2018/0091499 A1* | 3/2018 | Hayes | H04L 63/0846 |
| 2021/0157680 A1* | 5/2021 | LeCrone | G06F 11/1464 |
| 2022/0393885 A1* | 12/2022 | Myers | H04L 9/3263 |
| 2023/0300129 A1 | 9/2023 | Hojjati et al. | |
| 2025/0007902 A1* | 1/2025 | Kalidas | H04L 63/0823 |
| 2025/0047661 A1* | 2/2025 | Berbenetz | H04L 67/306 |

* cited by examiner

*Primary Examiner* — Jeffrey R Swearingen
(74) *Attorney, Agent, or Firm* — Baratta Law PLLC; Lawrence A. Baratta, Jr.

(57) ABSTRACT
Systems and methods for utilizing X509 certificates for granting access, such as for location tracking access, physical location access, access to digital content, and the like, include receiving a request for access from a requestor, wherein the request includes one or more of a time, a time period, a location, and a type of access, wherein the access is one of access to a user's location on a user device, access to a physical location, and access to content controlled by the user; issuing a certificate to the requestor based on the request, wherein the certificate includes the time period; one of allowing the requestor to perform the access until expiration of the time period and revoking the certificate prior to the expiration thereby preventing the access.

18 Claims, 4 Drawing Sheets

Figure 2:
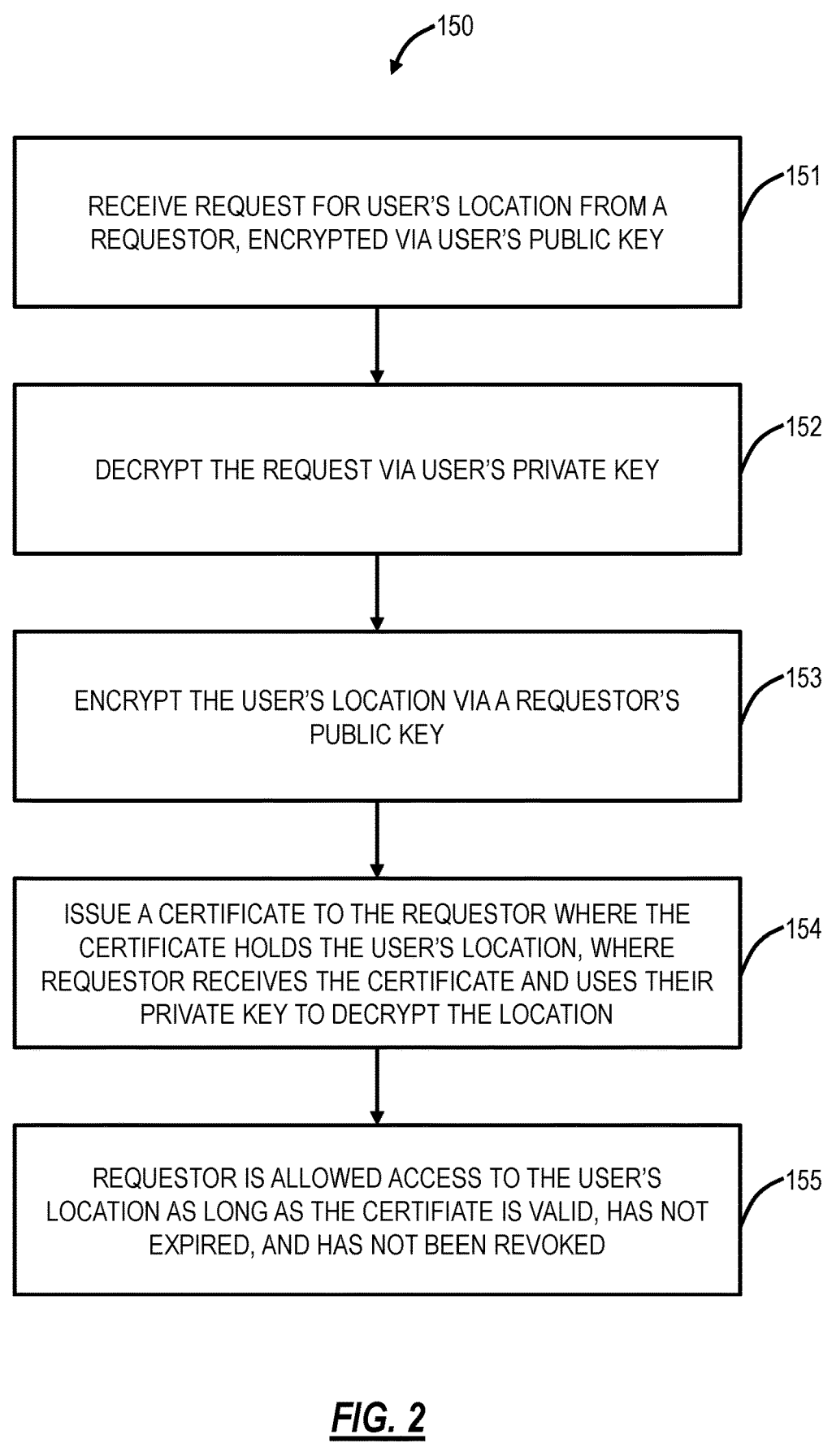

150

151 — RECEIVE REQUEST FOR USER'S LOCATION FROM A REQUESTOR, ENCRYPTED VIA USER'S PUBLIC KEY

152 — DECRYPT THE REQUEST VIA USER'S PRIVATE KEY

153 — ENCRYPT THE USER'S LOCATION VIA A REQUESTOR'S PUBLIC KEY

154 — ISSUE A CERTIFICATE TO THE REQUESTOR WHERE THE CERTIFICATE HOLDS THE USER'S LOCATION, WHERE REQUESTOR RECEIVES THE CERTIFICATE AND USES THEIR PRIVATE KEY TO DECRYPT THE LOCATION

155 — REQUESTOR IS ALLOWED ACCESS TO THE USER'S LOCATION AS LONG AS THE CERTIFIATE IS VALID, HAS NOT EXPIRED, AND HAS NOT BEEN REVOKED

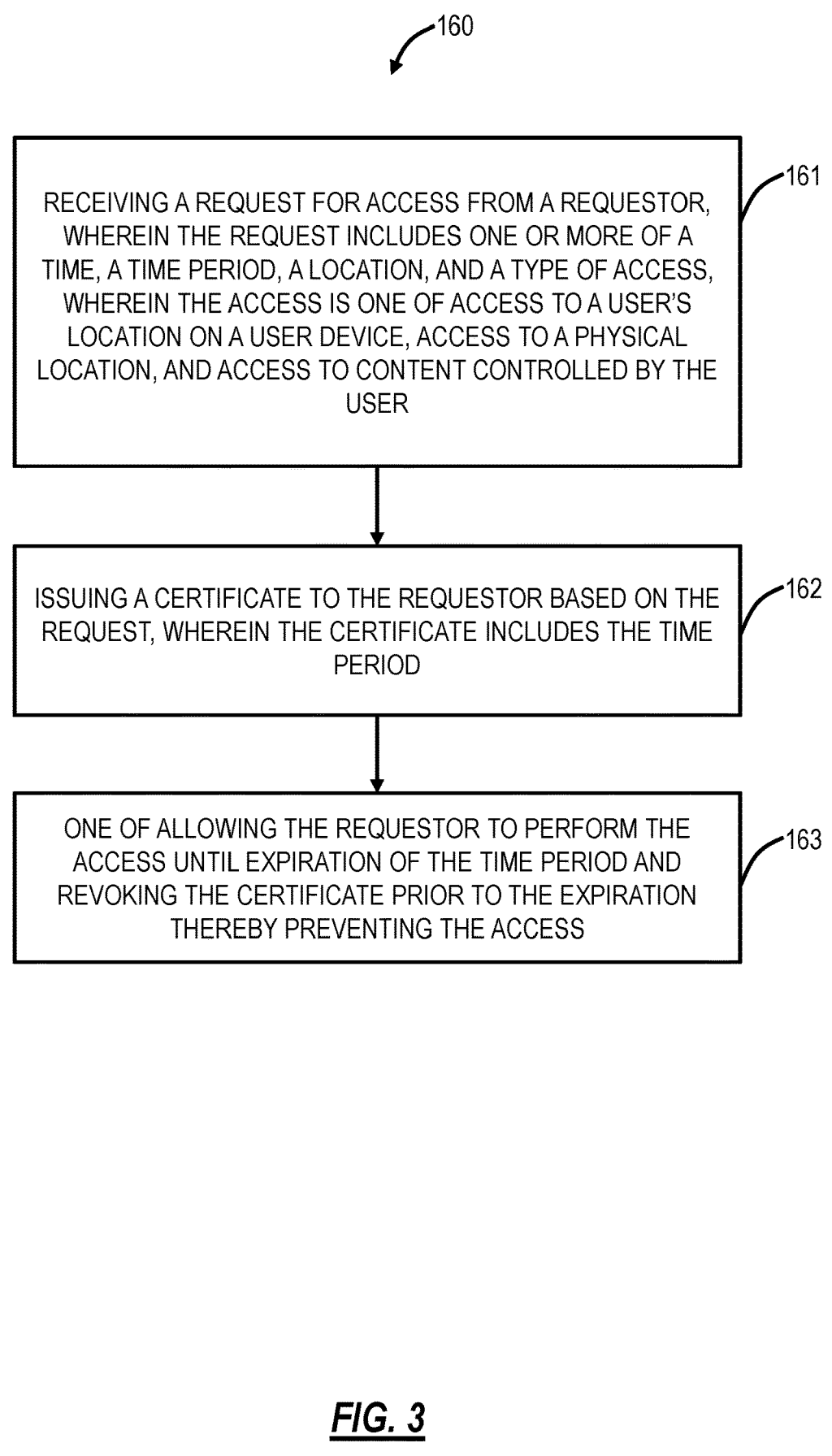

```
┌─────────────────────────────────────────────────────┐
│                                                      │─161
│  RECEIVING A REQUEST FOR ACCESS FROM A REQUESTOR,    │
│  WHEREIN THE REQUEST INCLUDES ONE OR MORE OF A       │
│  TIME, A TIME PERIOD, A LOCATION, AND A TYPE OF ACCESS,│
│  WHEREIN THE ACCESS IS ONE OF ACCESS TO A USER'S     │
│  LOCATION ON A USER DEVICE, ACCESS TO A PHYSICAL     │
│  LOCATION, AND ACCESS TO CONTENT CONTROLLED BY THE   │
│                      USER                            │
└─────────────────────────────────────────────────────┘
                         │
                         ▼
┌─────────────────────────────────────────────────────┐
│  ISSUING A CERTIFICATE TO THE REQUESTOR BASED ON THE │─162
│  REQUEST, WHEREIN THE CERTIFICATE INCLUDES THE TIME  │
│                     PERIOD                           │
└─────────────────────────────────────────────────────┘
                         │
                         ▼
┌─────────────────────────────────────────────────────┐
│  ONE OF ALLOWING THE REQUESTOR TO PERFORM THE        │─163
│  ACCESS UNTIL EXPIRATION OF THE TIME PERIOD AND      │
│  REVOKING THE CERTIFICATE PRIOR TO THE EXPIRATION    │
│  THEREBY PREVENTING THE ACCESS                       │
└─────────────────────────────────────────────────────┘
```

*FIG. 3*

UTILIZING X.509 CERTIFICATES FOR ACCESS TO LOCATION TRACKING, PHYSICAL LOCATION, OR DIGITAL CONTENT

FIELD OF THE DISCLOSURE

The present disclosure relates generally to computing, namely X.509 certificates. More particularly, the present disclosure relates to systems and methods for utilizing X509 certificates for granting access, such as for location tracking access, physical location access, access to digital content, and the like.

BACKGROUND OF THE DISCLOSURE

X.509 certificates are defined by ITU X.509, Information technology—Open Systems Interconnection—The Directory: Public-key and attribute certificate frameworks, October 2019, the contents of which are incorporated by reference in their entirety. An X.509 certificate binds an identity to a public key using a digital signature. As described herein, the present disclosure utilizes the terms X.509 certificate, digital certificate, and certificate interchangeably. A certificate contains an identity (a hostname, or an organization, or an individual) and a public key (e.g., RSA, DSA, ECDSA, ed25519, etc.), and is signed by a certificate authority. X509 also defines certificate revocation lists, which are a means to distribute information about certificates that have been deemed invalid by a signing authority, such as after being revoked, as well as a certification path validation algorithm, which allows for certificates to be signed by intermediate certificate authority (CA) certificates, which are, in turn, signed by other certificates, eventually reaching a trust anchor, an authoritative entity for which trust is assumed, such as a certificate authority.

A key aspect of X.509 is that it is a secure and trusted way to verifying the digital identity of individuals, organizations, or devices, as well as for encrypting communications (e.g., Transport Layer Security (TLS), Secure Sockets Layer (SSL), and the like, signing documents, signing code, etc. That is, the primary applications for X.509 are digital signatures, signing, and encryption.

BRIEF SUMMARY OF THE DISCLOSURE

The present disclosure relates to systems and methods for utilizing X509 certificates for granting access. Of note, the present disclosure leverages the existing X.509 framework of certificate issuance and revocation which is considered to be trustworthy due to the underlying cryptography and which allows the certificate owner control, i.e., an ability to revoke a given certificate making it no longer valid. Instead of using certificates for digital signatures, signing, and encryption, the present disclosure utilizes certificates for access, such as location tracking access, physical location access, access to digital content, and the like. Advantageously, the trusted framework of X.509 certificates allow a user to securely grant and revoke access. In an embodiment, X.509 certificates are used to allow a user to control access to their location on a mobile device, instead of relying on operating system or application controls which often are not trusted. In another embodiment, X.509 certificates are used to grant a user physical access such as to a location, instead of a key, badge, code, etc. In a further embodiment, X.509 certificates are used to grant access to digital content, such as audio, video, text, and the like. In all of these embodiments, the user can revoke access anytime using standard certificate revocation techniques. The present disclosure leverages the ubiquity of mobile devices, i.e., always with us, the trustworthiness of X.509 certificates, and the ability to revoke X.509 certificates, to enable an access approach.

In various embodiments, the present disclosure includes a method having steps, a processing device configured to implement the steps, a cloud service configured to implement the steps, and a non-transitory computer-readable medium storing instructions for programming one or more processors to execute the steps. The steps include receiving a request for access from a requestor, wherein the request includes one or more of a time, a time period, a location, and a type of access, wherein the access is one of access to a user's location on a user device, access to a physical location, and access to content controlled by the user; issuing a certificate to the requestor based on the request, wherein the certificate includes the time period; one of allowing the requestor to perform the access until expiration of the time period and revoking the certificate prior to the expiration thereby preventing the access.

BRIEF DESCRIPTION OF THE DRAWINGS

The present disclosure is illustrated and described herein with reference to the various drawings, in which like reference numbers are used to denote like system components/method steps, as appropriate, and in which:

FIG. 2 is a flowchart of a location tracking process utilizing certificates to control access to a user's location.

FIG. 3 is a flowchart of a process utilizing certificates to control access by a user.

DETAILED DESCRIPTION OF THE DISCLOSURE

Again, the present disclosure relates to systems and methods for utilizing X509 certificates for granting access, such as for location tracking access, physical location access, access to digital content, and the like.

System

Figure 1:
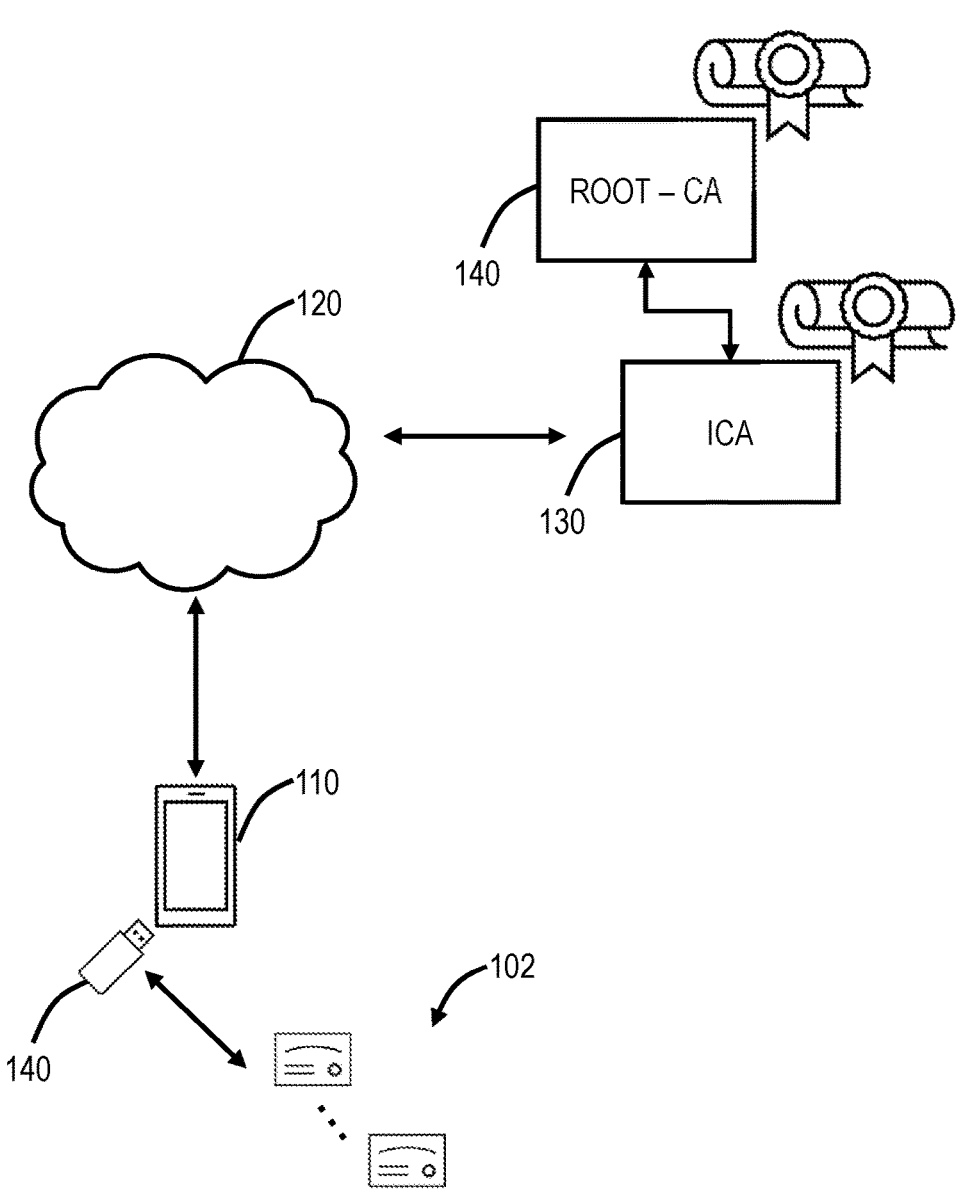
FIG. 1 is a network diagram of a network environment for illustrating use of X.509 certificates for access.

FIG. 1 is a network diagram of a network environment 100 for illustrating use of X.509 certificates 102 for access. The network environment 100 includes a user device 110 communicatively coupled to a network 120, such as the Internet, a wireless network, a cellular network, an enterprise network, and combinations thereof. An example of the user device 110 is described in FIG. 3. The user device 110, via a user, is configured to obtain one or more certificates 102 from an Intermediate Certificate Authority (ICA) 130 which issues the one or more certificates 102 based on a root 140, i.e., a trusted anchor such as a certificate authority. The one or more certificates 102 are end entity certificates and can be short-lived certificates.

A certificate authority (i.e., the ICA 130, the root 140) is an entity that stores, signs, and issues digital certificates. This allows others (relying parties) to rely upon signatures or on assertions made about the private key that corresponds to the certified public key. A CA acts as a trusted third party—trusted both by the subject (owner) of the certificate and by the party relying upon the certificate. In practice, the ICA 130 is an entity that is issuing the certificates 102 for access. For location access, the ICA 130 can be the owner of the location. For example, assume the location is a work site, then the ICA 130 can be the owner of the work site. For location tracking, content access, etc., the ICA 130 can be a service provider. The root 140 is a certificate authority that is ultimately trusted, i.e., a trust anchor.

A certificate authority has typically three layers of hierarchy—the root 140, the ICE 130, and the end-entity certificates 102. Typically, the root certificates have a long life, such as 10 years. The ICA 130 certificates can have less life, e.g., 6-8 years. The end-entity certificates 102 can have a life of anywhere from 1 minute to 10 years. Of note, the root 140 and the ICA 130 can be realized by servers, cloud resources, and the like. For example, an example of a server 200 is described in FIG. 2, and those skilled in the art will recognize one or more servers 200 can be configured to provide the root 140 and the ICA 130 functionality.

Variously, the ICA 130 is configured to issue the certificates 102 to users of the user device 110 for purposes of providing specific access. As described herein, access means location tracking access, physical location access, access to digital content, and the like. The purpose of the certificates 102 are to allow control of the access, where the access is defined based on the scope of a certificate 102, e.g., time, place, length, location, user, or any other specifics enumerated in the certificate 102. Further, where the user is able to revoke the certificate 102 to remove the access.

The certificates 102 can be stored on the user device 110 in a token device 140, in secure storage on the user device 110, in the cloud, in an HSM, etc. For example, a token device 140 can be a hardware authentication device, such as a Universal Serial Bus (USB) token (e.g., a YubiKey or the like). This is an external device that securely stores the certificates 102. The token device 140 is configured to connect to the user device 110 for accessing the certificates 102. The token device 140 enables access via the certificate 102 based on when the token device 140 is inserted or not, into the user device.

Alternatively, the certificates 102 can be stored locally on the user device 110, such as in secure storage thereon. Even further, the certificates 102 can be stored remotely, such as in a cloud storage, cloud Hardware Security Module (HSM), or the like. In an embodiment, the present disclosure includes the token device 140 because it provides a physical device that can be attached and removed from the user device 110 physically. That is, due to the nature of the proposed applications described herein, there is improved trust based on the physical separation of the certificate 102 via the token device 140.

The user is configured to request a certificate 102 for specific access based on the application. In particular, the applications can include (1) location tracking, i.e., using the certificate 102 to allow access to a user's location by an application, by the operating system of a user device 300, etc. ("third-party"), namely, the user is in control of her location and whether or not the third-party can access it or not based on the certificate 102. Here, the user issued the certificate 102 is an individual associated with the user device 300, and the certificate 102 is presented to the third-party when location access is desired or warranted.

(2) location access, i.e., physical access, using the certificate 102 to grant access to a location, room, building, or any physical location, namely using the certificate 102 as a replacement for a physical key, badge, code, etc. Here, the user issued the certificate 102 is the entity in charge of the location, e.g., an individual, a business, etc., and the certificate 102 is presented to another individual being granted access.

(3) access digital content, i.e., using the certificate 102 by a content creator to control the end use of that digital content. Here, the user issued the certificate 102 is associated with the digital content in some way, e.g., the author, an actor, a producer, a writer, etc. ("content creator"), and the certificate 102 is presented to an entity (user, organization, etc.) to be able to access and use the digital content within the bounds of the terms in the certificate 102, e.g., time, duration, location, outlet, etc.

X.509 Certificates

The certificates 102 are X.509 certificates, such as end-entity certificates. An end-entity certificate is a digitally-signed statement issued by a CA (the root 140 or the ICA 130) to a person or system. IL binds a public key to some identifying information and is used for encryption, authentication, digital signatures and other purposes. In the present disclosure, the other purposes are access as described herein. Each certificate 102 includes a public key, digital signature, and information about both the identity associated with the certificate and its issuing certificate authority: The public key is part of a key pair that also includes a private key. In Public key infrastructure (PKI), the private key is kept secure, and the public key is included in the certificate.

This public/private key pair:

(1) Allows the owner of the private key to digitally sign something; these signatures can be verified by anyone with the corresponding public key.

(2) Allows third parties to send messages encrypted with the public key that only the owner of the private key can decrypt.

A digital signature is an encoded hash (fixed-length digest) of a document that has been encrypted with a private key. When an X.509 certificate is signed by a publicly trusted CA, the certificate can be used by a third party to verify the identity of the entity presenting it.

Each X.509 certificate includes fields specifying the subject, issuing CA, and other required information such as the certificate's version and validity period. In addition, v3 certificates contain a set of extensions that define properties such as acceptable key usages and additional identities to bind a key pair to.

Using X.509 Certificates to Grant Access

The present disclosure contemplates using X.509 certificates in a novel application of granting access from one entity to another. A process to grant access is between two parties which can be referred to as the granting party and the accessing party. The certificate exchange process is bidirectional where both of the parties present their certificates to one another. A key aspect of the present disclosure is the ability to the granting party to revoke their certificate at any time, thereby removing the access from the receiving party.

For illustration purposes, there present disclosure describes three examples of using X.509 certificates for access—

(1) Location tracking where a user provides a certificate to an application, service, entity, etc. to allow access to that user's location. Here, the granting party is the user who is typically associated with a user device having location tracking ability. The accessing party is the application, service, entity, etc.

(2) Location access where an entity (person, landlord, business, etc.) provides a certificate to a person for the purpose of granting the person physical access, i.e., replacing a key, badge, code, etc. Here, the granting party is the entity, and the accessing party is the person.

(3) Digital content where an entity (e.g., user, actor, producer, writer, etc.) provides a certificate to a second entity (e.g., user, content provider, streaming service, etc.) for purposes of allowing the second entity to view or use the content. Here, the granting party is the entity, and the accessing party is the second entity.

Again, the process of certificate exchange is bidirectional between the granting and accessing party. Again, in PKI, there is a private and public key with the private key held secret by a certificate owner and with the public key in the certificate. Both the granting party and the accessing party will have a certificate to issue to one another. In the present disclosure, the accessing party can present a first certificate to show identity and provide the accessing party's public key, and the granting party can respond with a second certificate for access with the granting party's public key. The accessing party can use the second certificate for access until expiration or revocation by the granting party.

Location Tracking

With the advent of smart phones and devices, user location tracking is a pressing issue. In particular, smart phones and devices include mobile phones, tablets, laptops, wearable devices, and the like, and include location determination devices, such as Global Positioning Satellite (GPS) devices. As described herein, these smart phones and devices can be referred to as User Equipment (UE) and the present disclosure contemplates any computing device which supports location tracking, and which is mobile and often located with the user. There are various privacy concerns with this ability and current implementations. Specifically, the conventional approach makes a user's location available to the smart device, its operating system, and services providers or cloud services. There are options in the operating system to share or block the sharing of the location, but these options do not put the user ultimately in charge of this information, i.e., the user has to trust the operating system, service provider, cloud service, etc. That is, ultimately, the user must have confidence a setting to block her location is actually implemented.

To that end, the present disclosure utilizes X.509 certificates to ensure a user is ultimately in control of their location tracking access. Specifically, the present disclosure utilizes certificates, such as short-lived certificates, as well as the power of revoking certificates by the certificate owner to enable a solution to empower users with high confidence that they are in charge of their own locations. In this approach, a user will issue a certificate to the application where the application requests user's location. The application is allowed to use the user's location either based on a set period of time or until the user decides to revoke the certificate which will cause the application to stop tracking the user's location.

Conventionally, in a mobile device, for example, the mobile device operating system shares a user's location cryptographically with a key, but without certificates. For example, a phone creates a key, an application requesting location access is granting the same via the key, and once the access is denied, the key should be revoked, but may not necessarily be. The present disclosure generates a certificate instead of a key and presents the certificate for accessing the location. Of note here, there are trustworthy mechanisms to revoke a certificate or have it naturally expire based on its lifetime. As such, a user can have confidence in the ultimate control. Again, conventionally, a mobile device's operating system allows a user a couple of choices for location tracking for a given application, e.g., (1) always allow, (2) allow while the application is being used, or (3) deny. A user has to trust the operating system to control these choices. Also, it is possible for an application to maliciously bypass these instructions, such as via emulating a selection. This is not the case with the present disclosure—the user holds the certificate and can revoke anytime. Further, with the present disclosure, the operating system is now treated the same as any application, namely the operating system is granted the certificate as well.

FIG. 2 is a flowchart of a location tracking process 150 utilizing certificates to control access to a user's location. The location tracking process 150 is described with reference to a user, such as a user on a user device (see FIG. 5, user device 110), with a requestor being an entity requesting the user's location. The user's location is electronically available, such as via GPS, Wi-Fi networks, cell towers connectivity, device addresses such as Internet Protocol (IP) address, Bluetooth information, etc. That is, the user's location is typically a geographic location based on GPS or some other location determination technology but can also be any other electronic indication of location. Both the user and the requestor have processing capability and their own certificates with public keys and their corresponding private key held secret.

The process 150 includes receiving a request for a user's location from a requestor, and the request can be encrypted via a user's public key (step 151). Here, the user can be a user of the user device 110, and the requestor can be an application executed on the user device 110, as well as the operating system itself. The user has a public key which can be available to the requestor via a certificate identifying the user for purposes of requesting the user's location.

The process 150 includes decrypting the request via the user's private key (step 152), and, responsive to a desire to allow the requestor to access the user's location, the process 150 includes encrypting the user's location via the requestor's public key (step 153), and issue a certificate to the requestor where the certificate holds the user's location (step 154). The requestor receives the certificate and uses their private key to decrypt the user's location. The requestor is allowed access to the user's location as long as the certificate is valid, has not expired, and has not been revoked (step 156). For example, there can be a time value, via a short-lived certificate, where once it expires, the requestor no longer has access to the user's location. In another example, once the user decides to stop sharing their location, they can revoke the certificate they have thus disabling the application from using their location. Anyone can issue a certificate. In this case, the user enables the CA (enabling means using the users private key and a certificate signing request (CSR)) to issue an end entity certificate where that certificate holds/enables the right for any application to access the user's location. For example, the actual user's location can be made available in the user device 110 via an Application Programming Interface (API) that outputs such data from associated hardware devices. The present disclosure allows the requestor access to this information so long as they hold a valid certificate from the user.

As described herein, hold is referred to being able to use/have the permission to access certain API end points that the user has allowed the requestor to use. In this example (location), the user will grant permission for the specific app, for a certain period of time to use the API from the mobile operating system to use the location data.

Revocation means the user who holds the private key for the certificate/s that has been issued via the CA, will send a request to revoke that certificate and once that certificate is revoked the third party (requestor) will lose their access to the previously granted API. For example, a certificate authority (CA) can include one or more servers 200 as described in FIG. XX, and the CA can support issuing various certificates for holding user's location. This can be via an API, via a cloud service, or the like. For example, the user device 110 can include applications to support issuance and revocation of such user location tracking certificates.

These certificates can be stored on the user device 110, on an external security token such as a YubiKey, in a cloud service such as a cloud Hardware Security Module (HSM), or the like. For example, security tokens can include a Universal Serial Bus (USB) device or the like that can be plugged into the user device 110. Here, the user's location can only be available when the security token is plugged into the user device 110. This example provides physical security, namely the user's location is only available when security token holding the certificate is available.

Revocation can be via various approaches including going to a portal or using an application with the CA to revoke the certificate, removing the security token, removing the certificate in application settings, and the like.

Location Access

Also, similar to location tracking, there is also a need to provide a user location access. As described herein, location tracking involves a history of location where the user is or has been. Location access, on the other hand, involves granting a user access to a given location. Conventional approaches to location access include keys, key cards, access badges, access codes, and the like. These approaches provide some security, but each has flaws, e.g., lost key, stolen badge, etc.

Similar to the location tracking, the certificate exchanges in the process 150 can be used to provide physical access to a user. Here, the requestor can be the actual user with the user device 110 and the user can be a landlord or an entity in control of the physical location, e.g., a company, etc. For example, assume a user needs to access a data center belonging to a service provider, say for work related reasons, such as access to the Dallas data center for 1 hour on Monday morning. The entity in control can issue a certificate to the user these conditions. The user with their user device 110 can show up at the location, present the certificate to some hardware device, reader, etc., and be provided access. Alternatively, the user device's 110 location device can determine when the user shows up and grant access. This use case also enables audit control and history, i.e., the user showed up at the Dallas data center as instructed, etc.

With the ubiquity of user devices 110 and the fact users are typically tethered to such devices, there are various use cases here including replacing employee ID badges, replacing hotel keys, replacing automobile keys, or any key in general.

Content

In another use case, digital content can be controlled by a user with the process 150 as well. For example, assume the user is an actor, writer, producer, etc. of some digital content, e.g., video, audio, visual, literary, etc. The current approach to granting access involved contracts and the legal system for enforcement. Using certificates removes the complex and costly enforcement via the legal system. Now, the content owner can be in control without having to go to court. For example, assume I'm an actor and make a commercial for a given product and authorize the use of the commercial for 24 months, now I can issue a certificate for this commercial allowing its use for the 24 months, after which the certificate will expire and the content will no longer be accessible. Also, assume I no longer want to support the given product, I could revoke the certificate before the end of the 24 month period. In another example, I can even control which outlet the commercial can be played on, e.g., issuing certificates for each service which may broadcast the commercial, e.g., network 1, 2, 3, etc., and I can revoke on a per network basis. The key here is the user is now in control without having to resort to legal action to stop the use of their content.

Process Using Certificates for Granting Access

FIG. 3 is a flowchart of a process 160 utilizing certificates to control access by a user. The process 160 is described with reference to a user, such as a user on a user device (see FIG. 5, user device 110), with a requestor being an entity requesting access to something, from the user. As described herein, the access can be access to the user's location, physical access to a location controlled by the user, access to digital content, and the like. Both the user and the requestor have processing capability and their own certificates with public keys and their corresponding private key held secret. In all three examples, the certificate is issued to the user where he/she is holding the certificate. The request (could be their location, digital content, etc.) will be encrypted via their public key accessible to any entity. The act of granting the access to the content of the request will only be executed if and only if the receiver/data owner is capable of decrypting the message with their private key.

The process 160 includes receiving a request for access from a requestor, wherein the request includes one or more of a time, a time period, a location, and a type of access, wherein the access is one of access to a user's location on a user device, access to a physical location, and access to content controlled by the user (step 161); issuing a certificate to the requestor based on the request, wherein the certificate includes the time period (step 162); one of allowing the requestor to perform the access until expiration of the time period and revoking the certificate prior to the expiration thereby preventing the access (step 163).

The process 160 can include receiving the request for access encrypted via a public key associated with the user, wherein the public key associated with the user is in a second certificate for the user, available to the requestor. The process 160 can include encrypting the access for the certificate via a public key associated with the requestor, wherein the public key associated with the requestor is in a second certificate for the requestor, available to the user. The certificate can be an end entity X.509 certificate. The certificate can be stored in a security token configured to connect to the user device, such that the certificate is unavailable when the security token is removed.

The access can be the user's location on the user device, and the requestor is one of an application on the user device and an operating system on the user device. The user's location on the user device can be from an Application Programming Interface (API).

The access can be the access to the physical location, and the certificate includes the time, the time period, and the location of the physical location, and the process 160 can include maintaining an audit history of the requestor's access to the physical location. The access can be the access to content controlled by the user, and wherein the certificate can define where the content is accessible.

Example Server Architecture

Figure 4:
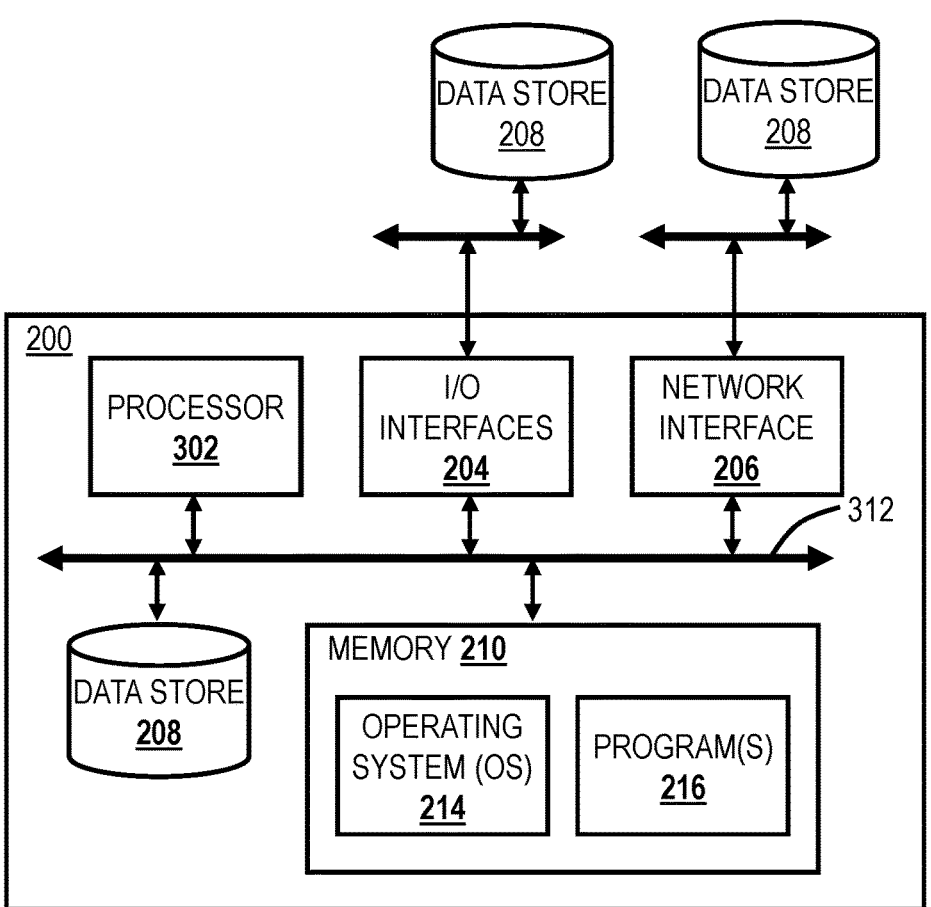
FIG. 4 is a block diagram of a server.

FIG. 4 is a block diagram of a server 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 4 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

The server 200 is merely presented as an example architecture for illustration purposes. Other physical embodiments are contemplated, including virtual machines (VM), software containers, appliances, network devices, and the like.

In an embodiment, the various techniques described herein can be implemented via a cloud service. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. The phrase "Software as a Service" (SaaS) is sometimes used to describe application programs offered through cloud computing. A common shorthand for a provided cloud computing service (or even an aggregation of all existing cloud services) is "the cloud."

Example User Device Architecture

Figure 5:
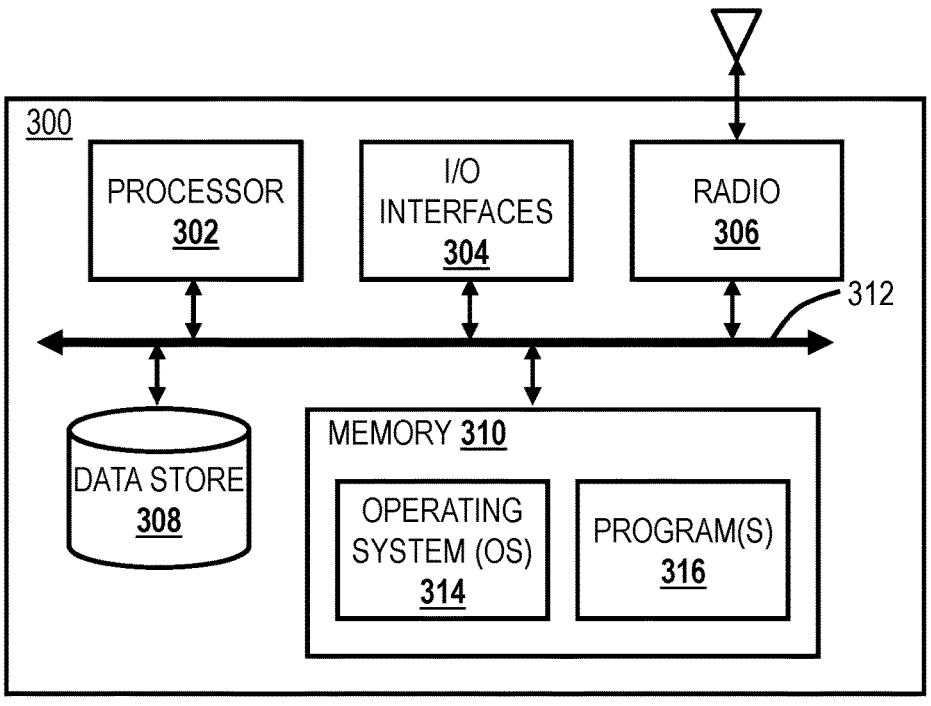
FIG. 5 is a block diagram of a user device.

FIG. 5 is a block diagram of a user device 110. Specifically, the user device 110 can include common devices such as laptops, smartphones, tablets, netbooks, personal digital assistants, MP3 players, cell phones, e-book readers, Internet of Things (IoT) devices, servers, desktops, printers, televisions, streaming media devices, and the like. The user device 110 can be a digital device that, in terms of hardware architecture, generally includes a processor 302, I/O interfaces 304, a network interface 306, a data store 308, and memory 310. It should be appreciated by those of ordinary skill in the art that FIG. 5 depicts the user device 110 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 110, a semiconductor-based microprocessor (in the form of a microchip or chipset), or generally any device for executing software instructions. When the user device 110 is in operation, the processor 302 is configured to execute software stored within the memory 310, to communicate data to and from the memory 310, and to generally control operations of the user device 110 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the user device 110. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network such as the cloud-based system 100.

CONCLUSION

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including software and/or firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," "a circuit configured to," "one or more circuits configured to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections include headers for various embodiments and those skilled in the art will appreciate these various embodiments may be used in combination with one another as well as individually.

What is claimed is:

1. A method comprising steps of:

receiving a request for access from a requestor, wherein the request includes one or more of a time, a time period, a location, and a type of access, wherein the access is one of access to a user's location on a user device, access to a physical location, and access to content controlled by the user;

issuing a certificate to the requestor based on the request, wherein the certificate includes the time period, wherein the certificate is an X.509 end-entity certificate issued by an Intermediate Certificate Authority (ICA) based on a trusted root Certificate Authority (CA), wherein the ICA is directly controlled by and specifically associated with the entity that has ownership or control over the requested access resource, wherein the certificate explicitly and directly encodes parameters limiting the requestor's access to the resource, including at least one of a permitted time, permitted physical location, or permitted type of access, wherein authorized access is determinable directly from the certificate itself without relying on any external authorization directory lookup or mapping mechanism; and one of allowing the requestor to perform the access until expiration of the time period and revoking the certificate prior to the expiration thereby preventing the access, wherein revocation of the certificate is performed by the controlling entity using a standard X.509 certificate revocation mechanism selected from Certificate Revocation Lists (CRL) or Online Certificate Status Protocol (OCSP), to immediately terminate the requestor's access as defined by the certificate parameter.

2. The method of claim 1, wherein the steps further include:

receiving the request for access encrypted via a public key associated with the user, wherein the public key associated with the user is in a second certificate for the user, available to the requestor.

3. The method of claim 1, wherein the steps further include:

encrypting the access for the X.509 end-entity certificate via a public key associated with the requestor, wherein the public key associated with the requestor is in a second certificate for the requestor, available to the user.

4. The method of claim 1, wherein the X.509 end-entity certificate is stored in a security token configured to connect to the user device, such that the certificate is unavailable when the security token is removed.

5. The method of claim 1, wherein the access is the user's location on the user device, and the requestor is one of an application on the user device and an operating system on the user device.

6. The method of claim 5, wherein the user's location on the user device is from an Application Programming Interface (API).

7. The method of claim 1, wherein the access is the access to the physical location, and the X.509 end-entity certificate encodes the time, the time period, and the location of the physical location, and wherein the steps further include:

maintaining an audit history of the requestor's access to the physical location.

8. The method of claim 1, wherein the access is the access to content controlled by the user, and wherein the X.509 end-entity certificate encodes parameters defining where the content is accessible.

9. A non-transitory computer-readable medium comprising instructions that, when executed, cause one or more processors to perform steps of:

receiving a request for access from a requestor, wherein the request includes one or more of a time, a time period, a location, and a type of access, wherein the access is one of access to a user's location on a user device, access to a physical location, and access to content controlled by the user;

issuing a certificate to the requestor based on the request, wherein the certificate includes the time period, wherein the certificate is an X.509 end-entity certificate issued by an Intermediate Certificate Authority (ICA)

based on a trusted root Certificate Authority (CA), wherein the ICA is directly controlled by and specifically associated with the entity that has ownership or control over the requested access resource, wherein the certificate explicitly and directly encodes parameters limiting the requestor's access to the resource, including at least one of a permitted time, permitted physical location, or permitted type of access, wherein authorized access is determinable directly from the certificate itself without relying on any external authorization directory lookup or mapping mechanism; and one of allowing the requestor to perform the access until expiration of the time period and revoking the certificate prior to the expiration thereby preventing the access, wherein revocation of the certificate is performed by the controlling entity using a standard X.509 certificate revocation mechanism selected from Certificate Revocation Lists (CRL) or Online Certificate Status Protocol (OCSP), to immediately terminate the requestor's access as defined by the certificate parameter.

10. The non-transitory computer-readable medium of claim 9, wherein the steps further include:

receiving the request for access encrypted via a public key associated with the user, wherein the public key associated with the user is in a second certificate for the user, available to the requestor.

11. The non-transitory computer-readable medium of claim 9, wherein the steps further include:

encrypting the access for the certificate via a public key associated with the requestor, wherein the public key associated with the requestor is in a second certificate for the requestor, available to the user.

12. The non-transitory computer-readable medium of claim 9, wherein the X.509 end-entity certificate is stored in a security token configured to connect to the user device, such that the certificate is unavailable when the security token is removed.

13. The non-transitory computer-readable medium of claim 9, wherein the access is the user's location on the user device, and the requestor is one of an application on the user device and an operating system on the user device.

14. The non-transitory computer-readable medium of claim 13, wherein the user's location on the user device is from an Application Programming Interface (API).

15. The non-transitory computer-readable medium of claim 13, wherein the access is the access to the physical location, and the X.509 end-entity certificate encodes the time, the time period, and the location of the physical location, and wherein the steps further include:

maintaining an audit history of the requestor's access to the physical location.

16. The non-transitory computer-readable medium of claim 9, wherein the access is the access to content controlled by the user, and wherein the X.509 end-entity certificate encodes parameters defining where the content is accessible.

17. An apparatus comprising:

one or more processors; and memory storing instructions that, when executed, cause the one or more processors to:

receive a request for access from a requestor, wherein the request includes one or more of a time, a time period, a location, and a type of access, wherein the access is one of access to a user's location on a user device, access to a physical location, and access to content controlled by the user;

issue a certificate to the requestor based on the request, wherein the certificate includes the time period, wherein the certificate is an X.509 end-entity certificate issued by an Intermediate Certificate Authority (ICA) based on a trusted root Certificate Authority (CA), wherein the ICA is directly controlled by and specifically associated with the entity that has ownership or control over the requested access resource, wherein the certificate explicitly and directly encodes parameters limiting the requestor's access to the resource, including at least one of a permitted time, permitted physical location, or permitted type of access, wherein authorized access is determinable directly from the certificate itself without relying on any external authorization directory lookup or mapping mechanism; and one of allow the requestor to perform the access until expiration of the time period and revoke the certificate prior to the expiration thereby preventing the access, wherein revocation of the certificate is performed by the controlling entity using a standard X.509 certificate revocation mechanism selected from Certificate Revocation Lists (CRL) or Online Certificate Status Protocol (OCSP), to immediately terminate the requestor's access as defined by the certificate parameter.

18. The apparatus of claim 17, wherein the memory storing instructions that, when executed, further cause the one or more processors to:

receive the request for access encrypted via a public key associated with the user, wherein the public key associated with the user is in a second certificate for the user, available to the requestor; and encrypt the access for the X.509 end-entity certificate via a public key associated with the requestor, wherein the public key associated with the requestor is in a second certificate for the requestor, available to the user.

*    *    *    *    *